(12) United States Patent
Kitaji (10) Patent No.: US 11,495,809 B2
(45) Date of Patent: Nov. 8, 2022

(54) POWER MANAGEMENT METHOD, POWER MANAGEMENT SERVER, LOCAL CONTROL APPARATUS, AND POWER MANAGEMENT SYSTEM

(71) Applicant: KYOCERA Corporation, Kyoto (JP)

(72) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 497 days.

(21) Appl. No.: 16/329,215

(22) PCT Filed: Aug. 31, 2017

(86) PCT No.: PCT/JP2017/031336
§ 371 (c)(1),
(2) Date: Feb. 28, 2019

(87) PCT Pub. No.: WO2018/043639
PCT Pub. Date: Mar. 8, 2018

(65) Prior Publication Data
US 2019/0190047 A1 Jun. 20, 2019

(30) Foreign Application Priority Data
Aug. 31, 2016 (JP) .............................. JP2016-168931

(51) Int. Cl.
*H01M 8/04858* (2016.01)
*F24H 1/00* (2022.01)
(Continued)

(52) U.S. Cl.
CPC .......... *H01M 8/04932* (2013.01); *F24H 1/00* (2013.01); *F24H 1/0018* (2013.01);
(Continued)

(58) Field of Classification Search
CPC ........... H01M 8/04611; H01M 8/04932; F24H 1/0018
See application file for complete search history.

(56) References Cited

U.S. PATENT DOCUMENTS

2014/0236370 A1\* 8/2014 Nakayama .......... H02J 13/0062
700/291

FOREIGN PATENT DOCUMENTS

EP 2882023 A1 6/2015
EP 2953230 A1 12/2015
(Continued)

OTHER PUBLICATIONS

Nicu Bizon et al., "Efficient energy control slialegies for a Stand-alone Renewable/Fuel Cell Hybrid Power Source", Energy Conversion and Management, 2015, pp. 93-110, 90, 18pp.
(Continued)

*Primary Examiner* — Jonathan G Jelsma
(74) *Attorney, Agent, or Firm* — Hauptman Ham, LLP (57) ABSTRACT

A power management method includes a step A of specifying an influence of a distributed power supply on a power demand-supply balance by a power management server, the power management server managing a plurality of facilities and the distributed power supply being individually provided in each of the plurality of facilities; and a step B of transmitting distributed power supply information from a local control apparatus to the power management server, the local control apparatus being individually provided in each of the plurality of facilities and the distributed power supply information including information indicating an operation state of the distributed power supply, wherein the step A includes a step of specifying the influence on the power demand-supply-demand balance based on the distributed power supply information.

17 Claims, 4 Drawing Sheets

(51) Int. Cl.
  *H01M 8/04537* (2016.01)
  *H01M 8/12* (2016.01)
  *H02J 3/38* (2006.01)
  *H02J 3/46* (2006.01)
  *H01M 8/04* (2016.01)
  *H02J 3/00* (2006.01)
  *H01M 8/00* (2016.01)
  *H02J 13/00* (2006.01)
  *H01M 8/10* (2016.01)

(52) U.S. Cl.
  CPC ............... *H01M 8/00* (2013.01); *H01M 8/04* (2013.01); *H01M 8/04611* (2013.01); *H01M 8/12* (2013.01); *H02J 3/00* (2013.01); *H02J 3/38* (2013.01); *H02J 3/46* (2013.01); *H02J 13/00* (2013.01); *H01M 8/10* (2013.01); *H01M 2250/405* (2013.01); *Y02E 40/70* (2013.01); *Y04S 10/12* (2013.01)

(56) References Cited

FOREIGN PATENT DOCUMENTS

| JP | 2005-102364 A | 4/2005 | |
|---|---|---|---|
| JP | 2013-24548 A | 2/2013 | |
| JP | 2013-169104 A | 8/2013 | |
| JP | 2014-128107 A | 7/2014 | |
| JP | 2014-149950 A | 8/2014 | |
| WO | WO-2006006224 A1 * | 1/2006 | ........ H01M 8/04619 |

OTHER PUBLICATIONS

Joe Blanchard, "Smart Energy Solutions Using Fuel Cells", 2011, IEEE, 8pp.

* cited by examiner

POWER MANAGEMENT METHOD, POWER MANAGEMENT SERVER, LOCAL CONTROL APPARATUS, AND POWER MANAGEMENT SYSTEM

RELATED APPLICATIONS

The present application is a National Phase of PCT/JP2017/031336, filed Aug. 31, 2017, and claims priority based on Japanese Patent Application No. 2016-168931, filed Aug. 31, 2016.

TECHNICAL FIELD

The present disclosure relates to a power management method, a power management server, a local control apparatus, and a power management system.

BACKGROUND ART

In recent years, a technology of suppressing a power flow amount from a power grid to a facility or a reverse power flow amount from the facility to the power grid in order to maintain a power demand-supply balance of the power grid has been known (see, for example, Patent Literatures 1 and 2).

Further, a system (hereinafter, referred to as a virtual power plant (VPP)) that uses distributed power supplies provided in a plurality of facilities as power supplies for supplying a power to a power grid has attracted attention. In the VPP, there is a need to interchange a power among the plurality of facilities, and a power management server that manages such power interchange is required.

CITATION LIST

Patent Literature

Patent Literature 1: Japanese Application Publication No. 2013-169104
Patent Literature 2: Japanese Application Publication No. 2014-128107

SUMMARY OF INVENTION

A power management method according to a first disclosure comprises a step A of specifying an influence of a distributed power supply on a power demand-supply balance by a power management server, the power management server managing a plurality of facilities and the distributed power supply being individually provided in each of the plurality of facilities; and a step B of transmitting distributed power supply information from a local control apparatus to the power management server, the local control apparatus being individually provided in each of the plurality of facilities, the distributed power supply information including information indicating an operation state of the distributed power supply. The step A includes a step of calculating the influence on the power demand-supply balance based on the distributed power supply information.

A power management server according to a second disclosure manages a plurality of facilities. The power management server comprises a controller configured to determine an influence of a distributed power supply on a power demand-supply balance, the distributed power supply being individually provided in each of the plurality of facilities; and a receiver configured to receive distributed power supply information from a local control apparatus, the local control apparatus being individually provided in each of the plurality of facilities and the distributed power supply information including information indicating an operation state of the distributed power supply. The controller is configured to specify the influence on the power demand-supply balance based on the distributed power supply information.

A local control apparatus according to a third disclosure controls a distributed power supply provided in a target facility which is any one of a plurality of facilities managed by a power management server. The local control apparatus comprises a transmitter configured to transmit distributed power supply information to the power management server, the distributed power supply information including information indicating an operation state of the distributed power supply. The distributed power supply information is used to specify an influence of the distributed power supply on the power demand-supply balance.

A power management system according to a fourth disclosure comprises a power management server configured to manage a plurality of facilities; and a local control apparatus configured to be individually provided in each of the plurality of facilities. The power management server includes: a controller configured to specify an influence of a distributed power supply on a power demand-supply balance, the distributed power supply being individually provided in each of the plurality of facilities; and a receiver configured to receive distributed power supply information from a local control apparatus, the local control apparatus being individually provided in each of the plurality of facilities and the distributed power supply information including information indicating an operation state of the distributed power supply. The controller is configured to specify the influence on the power demand-supply balance based on the distributed power supply information.

DESCRIPTION OF EMBODIMENTS

Hereinafter, embodiments will be described with reference to the drawings. In the following description of the drawings, the same or similar parts are denoted by the same or similar reference numerals.

However, it should be noted that the drawings are schematic and ratios and the like of the respective dimensions may be different from actual ratios and the like of the respective dimensions. Therefore, concrete dimensions and the like should be decided with reference to the following description. In addition, parts having different dimensional relationships or ratios are included between the drawings.

Embodiment (Power Management System)

Hereinafter, a power management system according to an embodiment will be described. In an embodiment, a system (hereinafter, referred to as a virtual power plant (VPP)) that uses a fuel cell apparatus 130 (fuel cell 131) provided in a facility 100 as a distributed power supply that can supply a power to at least a load or a power grid is described as an example.

Figure 1:
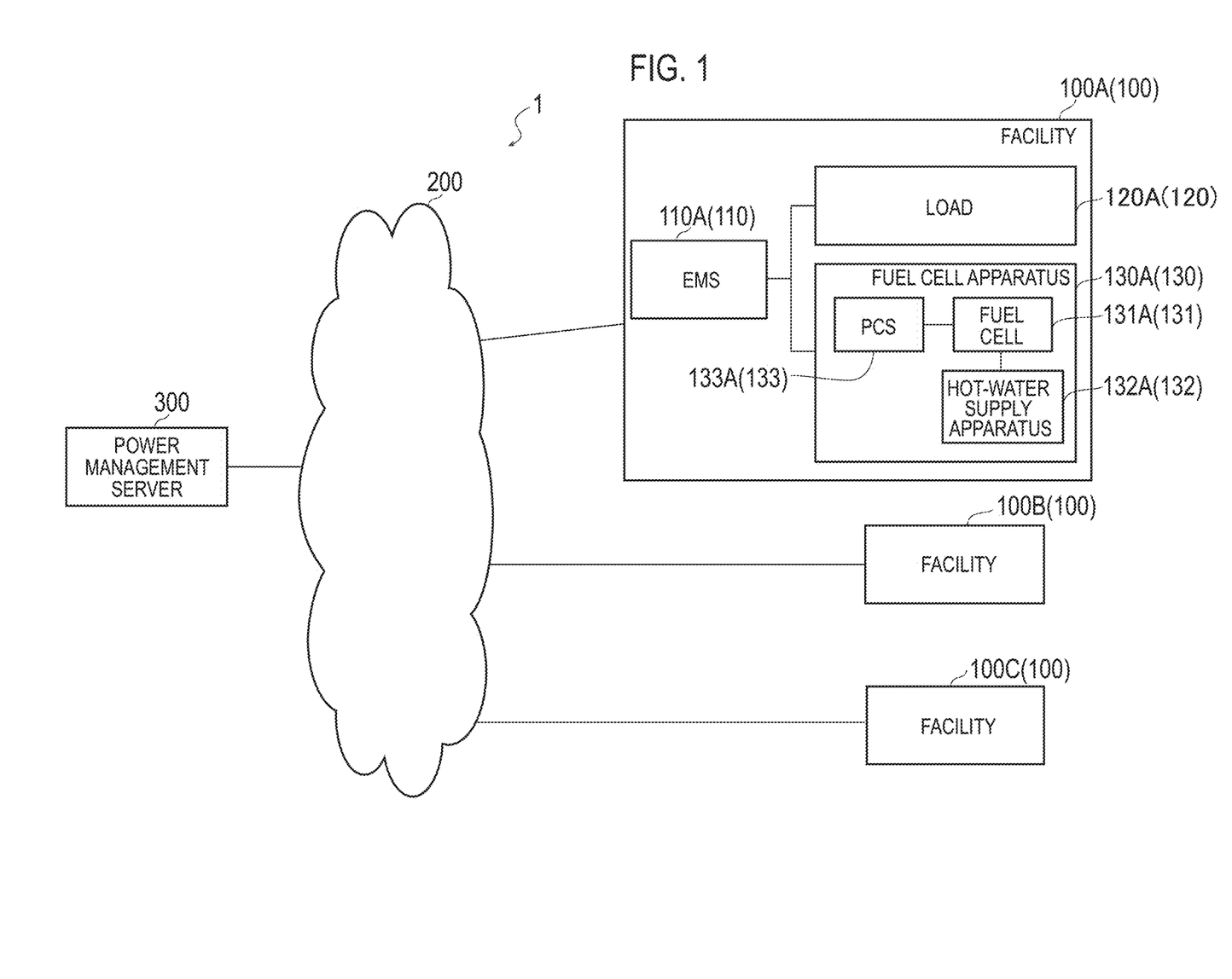
FIG. 1 is a view showing a power management system 1 according to an embodiment.

As shown in FIG. 1, a power management system 1 includes a facility 100, a network 200, and a power management server 300. In the embodiment, facilities 100A to 100C are exemplified as the facility 100. However, the facilities 100B and 100C have the same configuration as that of the facility 100A, and only the facility 100A will thus be described here. The facility 100 includes an EMS 110, a load 120, and the fuel cell apparatus 130.

The EMS 110 is an apparatus (energy management system (EMS)) that manages a power of an equipment provided in the facility 100. The EMS 110 may be a cloud server through the network 200. The EMS 110 is an example of a local control apparatus, and is an example of a virtual end node (VEN) apparatus.

The load 120 is an equipment that consumes a power. The load 120 includes an equipment such as a refrigerator, a freezer, a lighting apparatus, an air conditioner, or a television. The load 120 may include a single equipment and may include a plurality of equipments.

The fuel cell apparatus 130 is an example of the distributed power supply used in the VPP. The fuel cell apparatus 130 includes the fuel cell 131, a hot-water supply apparatus 132, and a PCS 133. The fuel cell 131 is an apparatus that generates a power using a fuel gas. The hot-water supply apparatus 132 includes a hot-water storage tank, and maintains or increases an amount of water (hot-water) stored in the hot-water storage tank or keeps a temperature of the water (hot-water) stored in the hot-water storage tank constant or raises the temperature of the water (hot-water) stored in the hot-water storage tank using exhaust heat of the fuel cell 131. The PCS 133 is an apparatus (power conditioning system) that converts a direct current (hereinafter, referred to as DC) power output from the fuel cell 131 into an alternating current (hereinafter, referred to as AC) power. It should be noted that a storage battery apparatus or a solar battery apparatus may be used as the dispersed power supply. In such a case, the storage battery apparatus includes a PCS and a storage battery, and the solar cell apparatus includes a PCS and a solar cell (solar cell panel).

The fuel cell apparatus 130 (fuel cell 131) may be any one of a solid oxide fuel cell (hereinafter, referred to as an SOFC), a polymer electrolyte fuel cell (hereinafter, referred to as a PEFC), a phosphoric acid fuel cell (hereinafter, referred to as a PAFC), and a molten carbonate fuel cell (hereinafter, referred to as an MCFC).

For example, the SOFC has characteristics that a transition time from a power generation state to a stop state and a transition time from the stop state to the power generation state are long. Therefore, even though an event in which the amount of hot-water in the hot-water storage tank reaches a target amount of hot-water or an event in which the temperature of the hot-water in the hot-water storage tank reaches a target temperature of the hot-water occurs, it may be better to continue the power generation state of the SOFC even though exhaust heat of the SOFC is discarded. Meanwhile, the PEFC has characteristics that the transition times described above are shorter than those of the SOFC. Therefore, when the event described above occurs, power generation of the PEFC may be stopped without discarding exhaust heat of the PEFC. The target amount of hot-water or the target temperature of the hot-water described above is set by, for example, a user of the facility 100.

Further, an operation state of the fuel cell apparatus 130 (fuel cell 131) is a state regarding an operation of the fuel cell apparatus 130, and may be a current operation state, may be a future operation state, or may be a past operation state. Specifically, the operation state of the fuel cell apparatus 130 includes any one of a first operation state in which the fuel cell apparatus 130 generates a predetermined power for a predetermined time, a second operation state in which the fuel cell apparatus 130 generates a power with a load following operation, and a third operation state in which the fuel cell apparatus 130 stops power generation. The first operation state, the second operation state, and the third operation state are only examples, and for example, the operation state may include at least one of the first operation state, the second operation state, and the third operation state or may include other operation states.

For example, in the first operation state, the predetermined power may be a rated power determined by capability of any one of the fuel cell 131 or the PCS 133. The rated power may be a recommended upper limit (for example, a catalog value) of a generated power determined by a maker of any one of the fuel cell 131 and the PCS 133. The predetermined power is determined based on a history of a consumed power of the load 120 and a history of a hot-water consumption amount of the hot-water supply apparatus 132, and may be a designated power smaller than the rated power. The designated power may be designated by the EMS 110 or may be designated by the PCS 133. In the first operation state, a surplus power for the consumed power of the load 120 may be supplied to the power grid. That is, the fuel cell apparatus 130 is used in the VPP by a reverse power flow of the surplus power.

For example, in the second operation state, the fuel cell apparatus 130 generates a target power determined based on the consumed power of the load 120. The target power may be the same as the consumed power of the load 120 or may be a power obtained by adding an offset power to the consumed power of the load 120. In such a case, the offset power is a surplus power supplied to the power grid.

For example, the third operation state may be an operation state in which a power is not output from the fuel cell apparatus 130. The third operation state may be an operation state (complete stop state) in which an operation of the fuel cell apparatus 130 is completely stopped, and may be an operation state (idling state) in which a chemical reaction to the extent that the temperature of the fuel cell apparatus 130 is kept at a predetermined temperature is performed. The chemical reaction to the extent that the temperature of the fuel cell apparatus is kept at the predetermined temperature may be a chemical reaction to the extent that a consumed power of the fuel cell apparatus 130 itself (for example, an auxiliary) is procured by the fuel cell apparatus 130. In the SOFC described above, a transition time from the power generation state to the idling state is shortened. The first operation state and the second operation state described above are examples of the power generation state.

The network 200 is a communication line connecting the facility 100 and the power management server 300 to each other. The network 200 may be, for example, a public line such as the Internet or a mobile communication network or a dedicated line such as a virtual private network (VPN). For example, a line of a B route that does not pass through a smart meter provided in the facility 100 may be used as the public line. A line of an A route that passes through the smart meter provided in the facility 100 may be used as the dedicated line. The smart meter is a wattmeter managed by a power generation company such as an electric power company and used to calculate billing for a power used in the facility 100 or an incentive for a power sold by the facility 100. A plurality of smart meters may be installed in the facility 100.

The power management server 300 is a server managed by a company such as a power generation company, a power transmission/distribution company, or a power retail company. The power management server 300 may be managed by an aggregator corresponding to the power transmission/distribution company or the power retail company. The aggregator is a company managing a power demand-supply balance of the facility 100 contracted with the aggregator. The aggregator may be entrusted with management of the power demand-supply balance from the power generation company such as the electric power company. The power management server 300 is an example of a virtual top node (VTN) apparatus. The power demand-supply balance includes, for example, a balance regarding supply or demand of a power, and a balance of grid stability.

The power management server 300 may transmit a power command message for controlling the distributed power supply provided in the facility 100. The power command message may be a power supply control message for requesting control of an operation of the distributed power supply installed in the facility 100. The power command message may be a power flow control message for requesting control (increase, decrease or maintenance) of a power flow amount from the power grid to the facility 100, or may be a reverse power flow control message for requesting control (increase, decrease, or maintenance) of a reverse power flow amount from the facility 100 to the power grid. The power supply control message may include a content for requesting the control of the operation of the distributed power supply, and may include or may not include a content of the power flow control message for requesting the control of the power flow amount or a content of the reverse power flow control message for requesting the control of the reverse power flow amount.

As a format of the power command message, a unique format may be used or a format conforming to an automatic demand response (ADR) may be used. More specifically, as the power command message, a manner conforming to an Open ADR 2.0 standard can be used.

(Power Management Server)

Hereinafter, a power management server according to an embodiment will be described.

Figure 2:
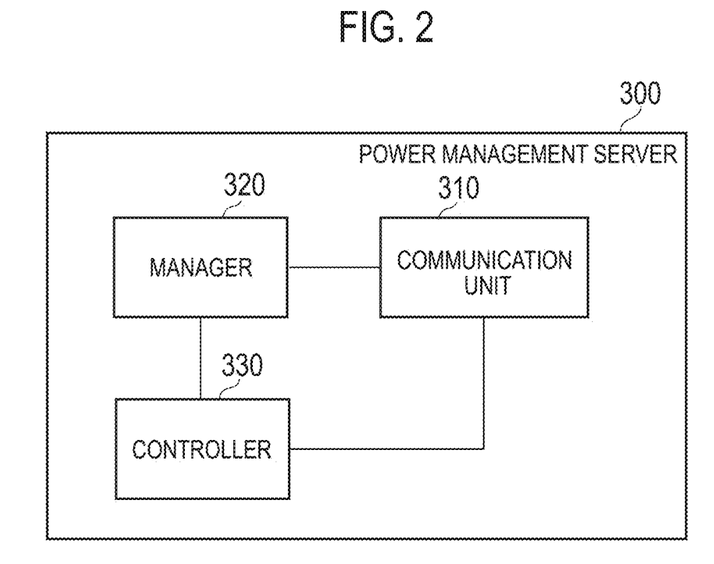
FIG. 2 is a view showing a power management server 300 according to an embodiment.

As shown in FIG. 2, a power management server 300 includes a communicator 310, a manager 320, and a controller 330.

The communicator 310 includes a communication module and the like, and communicates with the facility 100. For example, the communicator 310 transmits a power command message to the facility 100. The communicator 310 receives fuel cell information including information indicating an operation state of the fuel cell apparatus 130 from the facility 100.

The manager 320 includes a nonvolatile memory and/or a storage medium such as a hard disk drive (HDD), and manages a plurality of facilities 100 connected to the power grid.

The controller 330 includes a central processing unit (CPU), a memory, and the like, and controls the communicator 310 and the manager 320. The controller 330 controls a power demand-supply balance in all of the plurality of facilities 100 managed by the manager 320.

In the embodiment, the controller 330 specifies an influence of the fuel cell apparatus 130 provided in the facility 100 on the power demand-supply balance based on the fuel cell information. For example, the specifying of the power demand-supply balance may be calculation of a power demand-supply amount, or may be comparison between the power demand-supply amount and a target demand-supply amount of hot-water. The controller 330 may instruct the communicator 310 to transmit the power command message described above in order to adjust the power demand-supply balance in all of the plurality of facilities 100.

(Local Control Apparatus)

Figure 3:
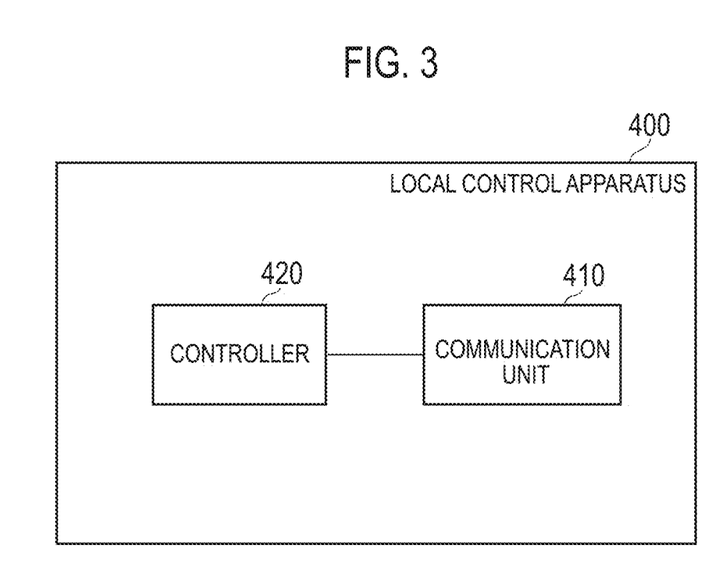
FIG. 3 is a view showing a local control apparatus 400 according to an embodiment.

Hereinafter, a local control apparatus according to an embodiment will be described. The local control apparatus may be an apparatus that controls the fuel cell apparatus 130 within the facility 100. The local control apparatus may be the EMS 110 described above or may be the PCS 133 described above. The local control apparatus may include both of the EMS 110 and the PCS 133. As shown in FIG. 3, the local control apparatus 400 includes a communicator 410 and a controller 420.

The communicator 410 includes a communication module and the like, and communicates with the power management server 300. For example, the communicator 410 receives a power command message from the power management server 300. The communicator 410 transmits the fuel cell information including the information indicating the operation state of the fuel cell apparatus 130 to the power management server 300.

The controller 420 includes a CPU, a memory, and the like, and controls the communicator 410. The controller 420 controls the fuel cell apparatus 130 within the facility 100.

In the embodiment, the controller 420 determines a local operation plan of the fuel cell apparatus 130 based on the history of the consumed power of the load 120 and the history of the hot-water consumption amount of the hot-water supply apparatus 132. The local operation plan is a plan indicating one of a plurality of predetermined operation states of the fuel cell apparatus 130 in a predetermined period in which the fuel cell apparatus 130 is operated in a predetermined time period. More specifically, the local operation plan is a plan indicating the operation state (the first operation state to the third operation state) for each time period of the fuel cell apparatus 130 in a predetermined period.

Here, the controller 420 may determine the local operation plan so that the target amount of hot-water or the target temperature of the hot-water is obtained at a target time (for example, in the evening). The controller 420 may determine the local operation plan so as to minimize, for example, a power procurement cost (for example, a purchase amount of a power supplied from the power grid, a purchase amount of a fuel gas or the like). The controller 420 may determine the local operation plan based on utilization efficiency of exhaust heat of the fuel cell apparatus 130. The controller 420 may determine the local operation plan based on characteristics (easiness of stop) of the fuel cell apparatus 130.

For example, when the fuel cell apparatus 130 is an SOFC, it is difficult to stop the SOFC, and an idling state may thus be used as the third operation state. Since exhaust heat of the SOFC is often discarded, the local operation plan may be determined with priority given to the power procurement cost. On the other hand, when the fuel cell apparatus 130 is a PEFC, it is easy to stop the PEFC, and a complete stop state may thus be used as the third operation state. Since exhaust heat of the PEFC is not often discarded, the local operation plan may be determined with priority given to the amount of hot-water or the temperature of the hot-water. The local operation plan may be changed when the target amount of hot-water and the target temperature of the hot-water are reached.

In the embodiment, the fuel cell information may include the following information.

Specifically, the fuel cell information may include information indicating any one of a power generation state and a stop state. The fuel cell information may include information indicating at least one of the first operation state to the third operation state described above. The operation state may be a current operation state or may be a future operation state.

The fuel cell information may include information indicating at least one of a power generation period in which an operation in the power generation state is performed and a stop period in which an operation in the stop state is performed. The fuel cell information may include information indicating at least one of a first period in which an operation in the first operation state is performed, a second period in which an operation in the second operation state is performed, and a third period in which an operation in the third operation state is performed.

The fuel cell information may include information indicating a type of fuel cell apparatus 130. The fuel cell information may include information indicating at least one of an SOFC, a PEFC, a PAFC and an MCFC.

The fuel cell information may include information indicating at least one of a power generation scheduled start time of the fuel cell apparatus 130, a power generation scheduled end time of the fuel cell apparatus 130, a power generation scheduled time period of the fuel cell apparatus 130, and a power generation scheduled power of the fuel cell apparatus 130.

The fuel cell information may include information indicating at least one of a current amount of hot-water of the hot-water supply apparatus 132, a target amount of hot-water of the hot-water supply apparatus 132, a current temperature of the hot-water of the hot-water supply apparatus 132, and a target temperature of the hot-water of the hot-water supply apparatus 132. The fuel cell information may include a scheduled time at which the target amount of hot-water or the target temperature of the hot-water will be realized.

The fuel cell information may include, for example, a measured value (° C.) of a temperature of hot-water of a water heater, a rated power generation amount (W), a heat amount (MJ) of a hot-water storage tank, a measured value of an instantaneous generated power (W) or an integrated value (kWh) thereof, a measured value of an instantaneous gas consumption amount ($m^3$/h), a measured value of an in-home instantaneous consumed power (W) or an integrated value (kWh) thereof, a measured value of an amount (liter) of remaining hot-water, a tank capacity value (liter) and the like.

Here, the controller 420 may include consumed power information indicating a consumed power of the load 120. The consumed power may be a current consumed power or may be a predicted future consumed power. The controller 420 may instruct the communicator 410 to transmit surplus power information indicating a surplus power of the facility 100. The surplus power may be a current surplus power or may be a future surplus power.

(Power Management Method)

Hereinafter, a power management method according to an embodiment will be described. Only one local control apparatus 400 is shown in FIG. 4, but a plurality of local control apparatuses 400 may be actually present.

Figure 4:
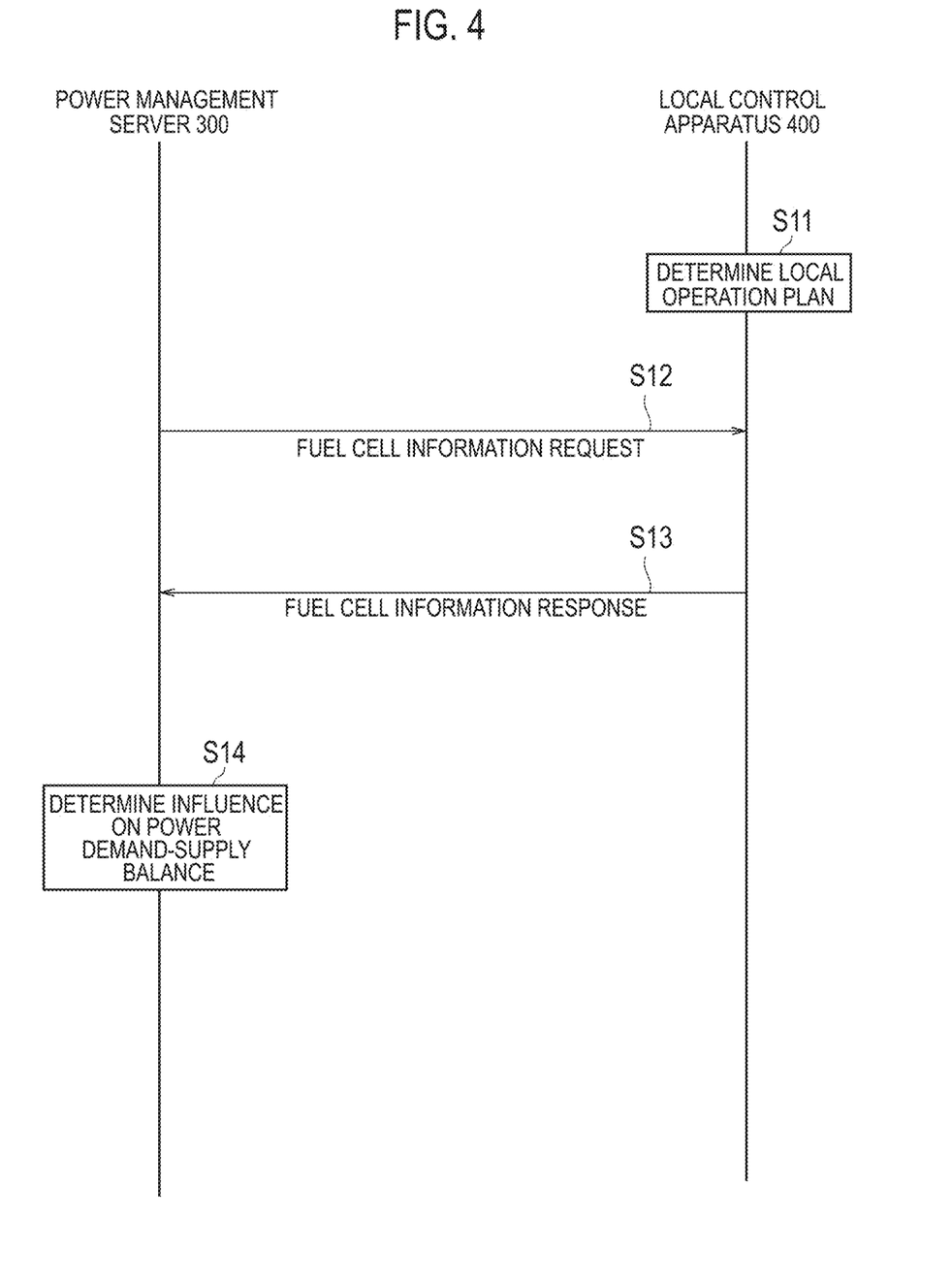
FIG. 4 is a view showing a power management method according to an embodiment.

As shown in FIG. 4, in step S11, the local control apparatus 400 determines a local operation plan. The local operation plan is determined based on the history of the consumed power of the load 120 and the history of the hot-water consumption amount of the hot-water supply apparatus 132.

In step S12, the power management server 300 transmits a message (fuel cell information request) for requesting fuel cell information to the local control apparatus 400.

In step S13, the local control apparatus 400 transmits a message (fuel cell information response) including the fuel cell information to the power management server 300. The fuel cell information includes information indicating the operation state of the fuel cell apparatus 130.

In step S14, the power management server 300 specifies an influence of the fuel cell apparatus 130 provided in the facility 100 on the power demand-supply balance based on the fuel cell information. When the power management server 300 receives the consumed power information, the power management server 300 may estimate the surplus power based on the fuel cell information and the consumed power information. When the power management server 300 receives the surplus power information, the power management server 300 may use the surplus power indicated by the surplus power information as it is or may modify the surplus power indicated by the surplus power information by the fuel cell information.

(Action and Effect)

In the embodiment, the power management server 300 can appropriately reduce a possibility of occurrence of excess or insufficiency of the surplus power by specifying the influence of the fuel cell apparatus 130 provided in the facility 100 on the power demand-supply balance based on the fuel cell information.

When the fuel cell information includes the information indicating any one of the power generation state and the stop state, it is easy to specify whether there is a possibility of the occurrence of the excess or the insufficiency of the surplus power. When the fuel cell information includes the information indicating at least one of the first operation state to the third operation state, accuracy in specifying the possibility of the occurrence of the excess or the insufficiency of the surplus power is improved. For example, when the operation in the first operation state is performed, there is a possibility of generation of the surplus power, and it is thus possible to specify that there is the possibility of the occurrence of the excess of the surplus power. On the other hand, when the operation in the second operation state or the operation in the third operation state is performed, there is no possibility of the generation of the surplus power, and it is thus possible to specify at least that the possibility of the occurrence of the excess of the surplus power is low.

When the fuel cell information includes the information indicating at least one of the power generation period in which the operation in the power generation state is performed and the stop period in which the operation in the stop state is performed, it is easy to estimate surplus electric energy (kWh) in a predetermined period. When the fuel cell information includes the information indicating at least one of the first period in which the operation in the first operation state is performed, the second period in which the operation in the second operation state is performed, and the third period in which the operation in the third operation state is performed, accuracy in estimating surplus electric energy (kWh) in a predetermined period is improved.

When the fuel cell information includes the information indicating the type of fuel cell apparatus 130, it is easy to specify whether the power generation state is the first operation state or the second operation state. Likewise, it is easy to specify whether the stop state (the third operation state) is the complete stop state or the idling state.

When the fuel cell information includes the type of fuel cell apparatus 130, in a case where different types of fuel cell apparatuses 130 are installed in the plurality of facilities 100, it is possible to shift power generation time periods, power generation start times, power generation end times, or the like depending on characteristics of the respective types of fuel cell apparatuses 130. Specifically, for example, it is conceivable to utilize characteristics that a time from a start to a state where a power can be generated is shorter in the PEFC than in the SOFC. By transmitting the power command message so that a power generation start time of the PEFC becomes earlier than that of the SOFC, it is possible to maintain the power demand-supply balance of the plurality of facilities 100 without causing a delay time. In such a case, the power management server 300 may change the power generation start time by transmitting the power command message at different timings or may transmit a power command message for designating different power generation start times.

When the fuel cell information includes the power generation scheduled start time of the fuel cell apparatus 130, it is easy to specify a time period in which the excess of the surplus power occurs. When the fuel cell information includes the power generation scheduled end time of the fuel cell apparatus 130, it is easy to specify a timing at which it is difficult for the surplus power to be generated. When the fuel cell information includes the power generation scheduled time period of the fuel cell apparatus 130, it is easy to specify a time period in which the excess or the insufficiency of the surplus power occurs. When the fuel cell information includes the power generation scheduled power of the fuel cell apparatus 130, it is easy to specify a level of the surplus power.

When the fuel cell information includes the current amount of hot-water of the hot-water supply apparatus 132 and the target amount of hot-water of the hot-water supply apparatus 132, it is possible to improve accuracy in specifying a power generation end time of the fuel cell apparatus 130. Likewise, when the fuel cell information includes the current temperature of the hot-water of the hot-water supply apparatus 132 and the target temperature of the hot-water of the hot-water supply apparatus 132, it is possible to improve accuracy in specifying the power generation end time of the fuel cell apparatus 130. When the local information includes the scheduled time at which the target amount of hot-water or the target temperature of the hot-water will be realized, it is possible to further improve the accuracy in specifying the power generation end time of the fuel cell apparatus 130.

When the consumed power information or the surplus power information is transmitted from the local control apparatus 400 to the power management server 300, the accuracy in estimating the surplus power (surplus electric energy) is improved.

MODIFIED EXAMPLE 1

Hereinafter, Modified Example 1 of the embodiment will be described. Portions different from those of the embodiment will be described below.

Although not particularly limited in the embodiment, fuel cell information according to Modified Example 1 includes information indicating an operation state of the fuel cell apparatus 130 in a future target period in which an influence on a power demand-supply balance is to be specified. The power management server 300 specifies an influence on a power demand-supply balance in a target period based on the fuel cell information. Here, the target period is a period in which the operation of the fuel cell apparatus 130 is scheduled.

(Power Management Method)

Hereinafter, a power management method according to an embodiment will be described. Only one local control apparatus 400 is shown in FIG. 5, but a plurality of local control apparatuses 400 may be actually present.

Figure 5:
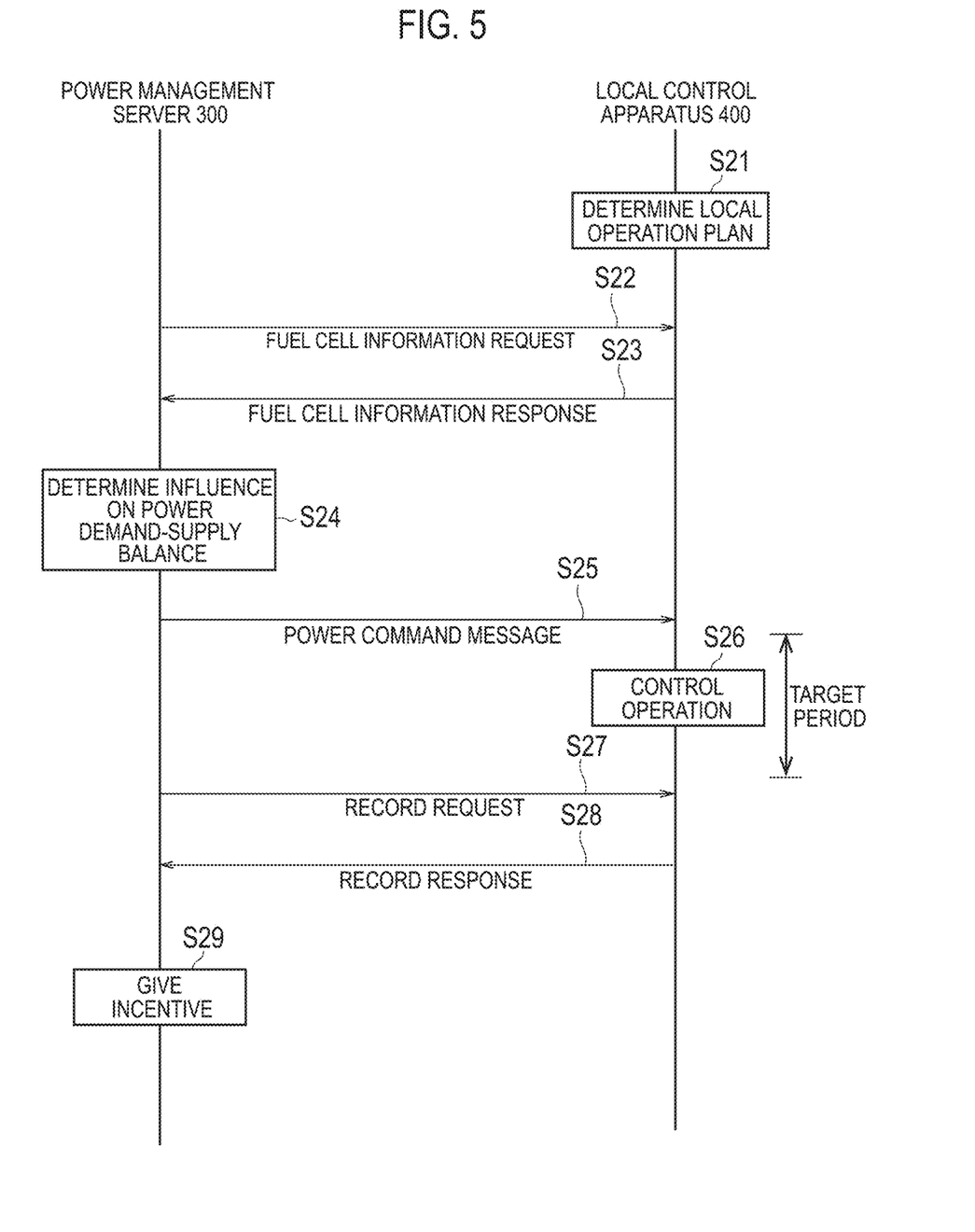
FIG. 5 is a view showing a power management method according to Modified Example 1.

As shown in FIG. 5, in step S21, the local control apparatus 400 determines a local operation plan. The local operation plan is determined based on the history of the consumed power of the load 120 and the history of the hot-water consumption amount of the hot-water supply apparatus 132.

In step S22, the power management server 300 transmits a message (fuel cell information request) for requesting fuel cell information to the local control apparatus 400.

In step S23, the local control apparatus 400 transmits a message (fuel cell information response) including the fuel cell information to the power management server 300. The fuel cell information includes information indicating an operation state of the fuel cell apparatus 130 in the target period.

In step S24, the power management server 300 specifies the influence on the power demand-supply balance in the target period based on the fuel cell information. Here, a case where the power management server 300 specifies that there is an influence on the power demand-supply balance will be described.

In step S25, the power management server 300 transmits a power command message to the local control apparatus 400 in order to adjust a power demand-supply balance in all of the plurality of facilities 100.

Here, in order to solve the excess or the insufficiency of the surplus power described above, the power management server transmits a power command message for shifting the power generation time period and the stop time period. The power command message may be a message for instructing that an operation state included in the local operation plan is changed.

In step S26, the local control apparatus 400 controls an operation state of the fuel cell apparatus 130.

Here, since the local operation plan is optimized within the facility 100, the local control apparatus 400 may control the operation state of the fuel cell apparatus 130 without following the power command message. However, in the embodiment, the local control apparatus 400 controls the operation state of the fuel cell apparatus 130 without following the power command message.

In step S27, the power management server 300 transmits a message (record request) for requesting an operation control record of the fuel cell apparatus 130 to the local control apparatus 400.

In step S28, the local control apparatus 400 transmits a message (record response) including the operation control record of the fuel cell apparatus 130 to the power management server 300.

In step S29, the power management server 300 gives an incentive according to a change in the local operation plan optimized within the facility 100. The incentive may be a monetary reward, a reward by an intangible thing such as a gift certificate or a coupon, or may be a reward by a tangible thing such as a premium.

Other Embodiments

Although the present invention has been described with reference to the abovementioned embodiment, it should not be understood that the description and the drawings constituting a part of this disclosure limit the present invention. From this disclosure, various alternative embodiments, examples, and operational technologies will be apparent to those skilled in the art.

Although not particularly limited, in FIGS. 4 and 5, the local control apparatus 400 may periodically transmit a polling signal to the power management server 300. The power management server 300 transmits various messages to the local control apparatus 400 depending on reception of the polling signal. The local control apparatus 400 may autonomously transmit a message to the power management server 300 even though the local control apparatus 400 does not receive a request from the power management server 300.

Although not particularly limited, communication between the power management server 300 and the local control apparatus 400 may be performed in a manner conforming to an Open ADR standard. In such a case, for example, ordrPoll can be used as the polling signal. For example, oadrDistributeEvent can be used as a power command message. TELEMETRY USAGE and TELEMETRY STATUS can be used as a fuel cell information response and a record response.

Although not particularly limited, flows shown in FIGS. 4 and 5 may be periodically performed. The term 'periodically' means that the flows may be performed once/n days (n is an integer of 1 or more) or may be performed once/n hours (n is an integer of 1 or more), for example. The flows shown in FIGS. 4 and 5 may also be performed depending on occurrence of a predetermined event. The predetermined event may be an event in which a power demand-supply balance collapses in a management area managed by the power management server 300, may be an event in which a power demand-supply balance collapses in a wide area wider than the management area, or may be a natural disaster or the like.

Although not particularly limited, the "power" described above may be an instantaneous value (kW). The "power" described above may also be called electric energy (kWh) when being accompanied by a concept of time.

Although not particularly limited, information elements required for specifying the influence on the power demand-supply balance may not be necessarily transmitted from the local control apparatus 400. For example, information indicating at least one of a rated power of the fuel cell apparatus 130 and a type of fuel cell apparatus 130 may be registered in advance in the power management server 300 in installation application or the like of the fuel cell apparatus 130. Information indicating at least one of the target amount of hot-water of the hot-water supply apparatus and the target temperature of the hot-water of the hot-water supply apparatus may be registered in advance in the power management server 300 in installation application or the like of the fuel cell apparatus 130. Information indicating the history of the consumed power of the load 120 and the history of the hot-water consumption amount of the hot-water supply apparatus 132 may be registered in advance in the power management server 300 by a questionnaire or the like.

The case where the distributed power supply is the fuel cell apparatus 130 has been described in the embodiment, but it is obvious that the distributed power supply may be a storage battery apparatus. In such a case, it is obvious that distributed power supply information is not the fuel cell information, and is storage battery information. The operation state of the storage battery apparatus may be a past operation state, a current operation state, or a future operation state, similar to the fuel cell apparatus 130. The operation state may include the following operation states. The operation state is a charging state, a discharging state, and a stop state. Further, the operation state may be a state in which discharging or charging of a predetermined power is performed. The predetermined power may be, for example, a rated power, a rated voltage, or a maximum current determined by capability of any one of the storage battery or the PCS. The rated power may be a recommended upper limit (for example, a catalog value) of an output power determined by a maker of any one of the storage battery and the PCS.

In addition, in the case where the distributed power supply is the storage battery apparatus, the local control apparatus 400 may transmit storage battery information including information indicating a type of storage battery apparatus (more specifically, storage battery) to the power management server 300. Examples of the type of storage battery apparatus include a lithium ion battery, a nickel cadmium battery, a nickel hydrogen battery, a lead storage battery, and the like. A case where supplementary charging is appropriate and a case where supplementary charging is not appropriate can be considered due to a difference between types of storage battery apparatuses. Therefore, it is possible to appropriately manage the storage battery apparatus by transmitting the type of storage battery apparatus. In addition, the fuel cell information may include information indicating at least one of the number of days in which the storage battery is used, a capacity of the storage battery, the number of times of charging of the storage battery, and the number of times of discharging of the storage battery, in addition to the type of storage battery apparatus.

The entire contents of Japanese Patent Application No. 2016-168931 (filed on Aug. 31, 2016) are incorporated herein by reference.

INDUSTRIAL APPLICABILITY

According to one aspect, it is possible to provide a power management method, a power management server, a local control apparatus, and a power management system that appropriately manage a distributed power supply.

The invention claimed is:

1. A power management method, comprising:
specifying, by a power management server, an influence of a fuel cell apparatus on a power demand-supply balance, the power management server managing a plurality of facilities, and the fuel cell apparatus being individually provided in each of the plurality of facilities; and
transmitting fuel cell information, by a local control apparatus to the power management server, the local control apparatus individually provided in each of the plurality of facilities, the fuel cell information including information indicating an operation state of the fuel cell apparatus,
wherein
the transmitting includes transmitting, by the local control apparatus, to the power management server, information possible to identify a first operation state that the fuel cell apparatus generates a predetermined power and a second operation state that the fuel cell apparatus generates an undetermined power with a load following control, as the fuel cell information indicating a power generation state of the fuel cell apparatus, and the specifying includes calculating the influence of the fuel cell apparatus on the power demand-supply balance based on the fuel cell information.

2. The power management method according to claim 1, wherein the fuel cell information further includes information indicating a further operation state of the fuel cell apparatus in a future target period in which the influence of the fuel cell apparatus on the power demand-supply balance is to be specified, and the specifying includes specifying the influence of the fuel cell apparatus on the power demand-supply balance in the future target period based on the fuel cell information.

3. The power management method according to claim 1, wherein the fuel cell information further includes information indicating a stop state of the fuel cell apparatus.

4. The power management method according to claim 3, wherein the fuel cell information further includes information indicating at least one of a power generation period in which an operation in the power generation state is performed and a stop period in which an operation in the stop state is performed.

5. The power management method according to claim 1, wherein the fuel cell information further includes information indicating a third operation state in which the fuel cell apparatus stops power generation.

6. The power management method according to claim 5, wherein the fuel cell information further includes information indicating at least one of a first period in which an operation in the first operation state is performed, a second period in which an operation in the second operation state is performed, and a third period in which an operation in the third operation state is performed.

7. The power management method according to claim 1, wherein the fuel cell information further includes information indicating a type of the fuel cell apparatus.

8. The power management method according to claim 7, wherein at least two facilities of the plurality of facilities have different types of fuel cell apparatuses, respectively, and the power management method further comprises: transmitting, by the power management server, to the local control apparatuses provided in the at least two facilities, a power command message indicating that a power generation start time in a case where the fuel cell information indicates a polymer electrolyte fuel cell is earlier than in a case where the fuel cell information indicates a solid oxide fuel.

9. The power management method according to claim 7, wherein at least two facilities of the plurality of facilities have different types of fuel cell apparatuses, respectively, and the power management method further comprises: transmitting, by the power management server, power command messages to the local control apparatuses provided in the at least two facilities for instructing the local control apparatuses to start power generation of the fuel cell apparatuses at different power generation start times.

10. The power management method according to claim 1, wherein the fuel cell information further includes information indicating at least one of a power generation scheduled start time of the fuel cell apparatus, a power generation scheduled end time of the fuel cell apparatus, a power generation scheduled time period of the fuel cell apparatus, or a power generation scheduled power of the fuel cell apparatus.

11. The power management method according to claim 1, wherein exhaust heat of the fuel cell apparatus is used to control an amount of hot-water or a temperature of the hot-water of a hot-water supply apparatus individually provided in the each of the plurality of facilities, and the fuel cell information further includes information indicating at least one of a current amount of hot-water of the hot-water supply apparatus, a target amount of hot-water of the hot-water supply apparatus, a current temperature of the hot-water of the hot-water supply apparatus, or a target temperature of the hot-water of the hot-water supply apparatus.

12. The power management method according to claim 1, wherein the specifying includes specifying, by the power management server, a surplus power of the fuel cell apparatus when the fuel cell apparatus is in the first operation state, and specifying, by the power management server, that possibility of occurrence of excess of the surplus power of the fuel cell apparatus is low when the fuel cell apparatus is in the second operation state.

13. A power management server for managing a plurality of facilities, the power management server comprising:

a controller configured to determine an influence of a fuel cell apparatus on a power demand-supply balance, the fuel cell individually provided in each of the plurality of facilities; and a receiver configured to receive fuel cell information from a local control apparatus, the local control apparatus individually provided in the each of the plurality of facilities, and the-fuel cell information including information indicating an operation state of the fuel cell apparatus, wherein the receiver is configured to receive, from the local control apparatus, information possible to identify a first operation state that the fuel cell apparatus generates a predetermined power and a second operation state that the fuel cell apparatus generates an undetermined power with a load following control, as the fuel cell information indicating a power generation state of the fuel cell apparatus, and the controller is configured to specify the influence of the fuel cell apparatus on the power demand-supply balance based on the fuel cell information.

14. The power management server according to claim 13, wherein
the controller is configured to
specify a surplus power of the fuel cell apparatus when the fuel cell apparatus is in the first operation state, and
specify that possibility of occurrence of excess of the surplus power of the fuel cell apparatus is low when the fuel cell apparatus is in the second operation state.

15. A local control apparatus for controlling a fuel cell apparatus provided in a target facility which is any one of a plurality of facilities managed by a power management server, the local control apparatus comprising:
a transmitter configured to transmit fuel cell information to the power management server, the fuel cell information including information indicating an operation state of the fuel cell apparatus,
wherein
the transmitter is configured to transmit, to the power management server, information possible to identify a first operation state that the fuel cell apparatus generates a predetermined power and a second operation state that the fuel cell apparatus generates an undetermined power with a load following control, as the fuel cell information indicating a power generation state of the fuel cell apparatus, and
the fuel cell information is used by the power management server to specify an influence of the fuel cell apparatus on a power demand-supply balance.

16. A power management system, comprising:
a power management server configured to manage a plurality of facilities; and
a local control apparatus individually provided in each of the plurality of facilities,
the power management server including:
a controller configured to specify an influence of a fuel cell apparatus on a power demand-supply balance, the fuel cell apparatus being individually provided in the each of the plurality of facilities; and
a receiver configured to receive fuel cell information from the local control apparatus, the fuel cell information including information indicating an operation state of the fuel cell apparatus,
wherein
the receiver is configured to receive, from the local control apparatus, information possible to identify a first operation state that the fuel cell apparatus generates a predetermined power and a second operation state that the fuel cell apparatus generates an undetermined power with a load following control, as the fuel cell information indicating a power generation state of the fuel cell apparatus, and
the controller is configured to specify the influence of the fuel cell apparatus on the power demand-supply balance based on the fuel cell information.

17. The power management system according to claim 16, wherein
the controller is configured to
specify a surplus power of the fuel cell apparatus when the fuel cell apparatus is in the first operation state, and
specify that possibility of occurrence of excess of the surplus power of the fuel cell apparatus is low when the fuel cell apparatus is in the second operation state.

* * * * *